Sept. 8, 1925.
C. V. SMITH
1,553,007
VEGETABLE CUTTER
Filed June 19, 1924     5 Sheets-Sheet 1
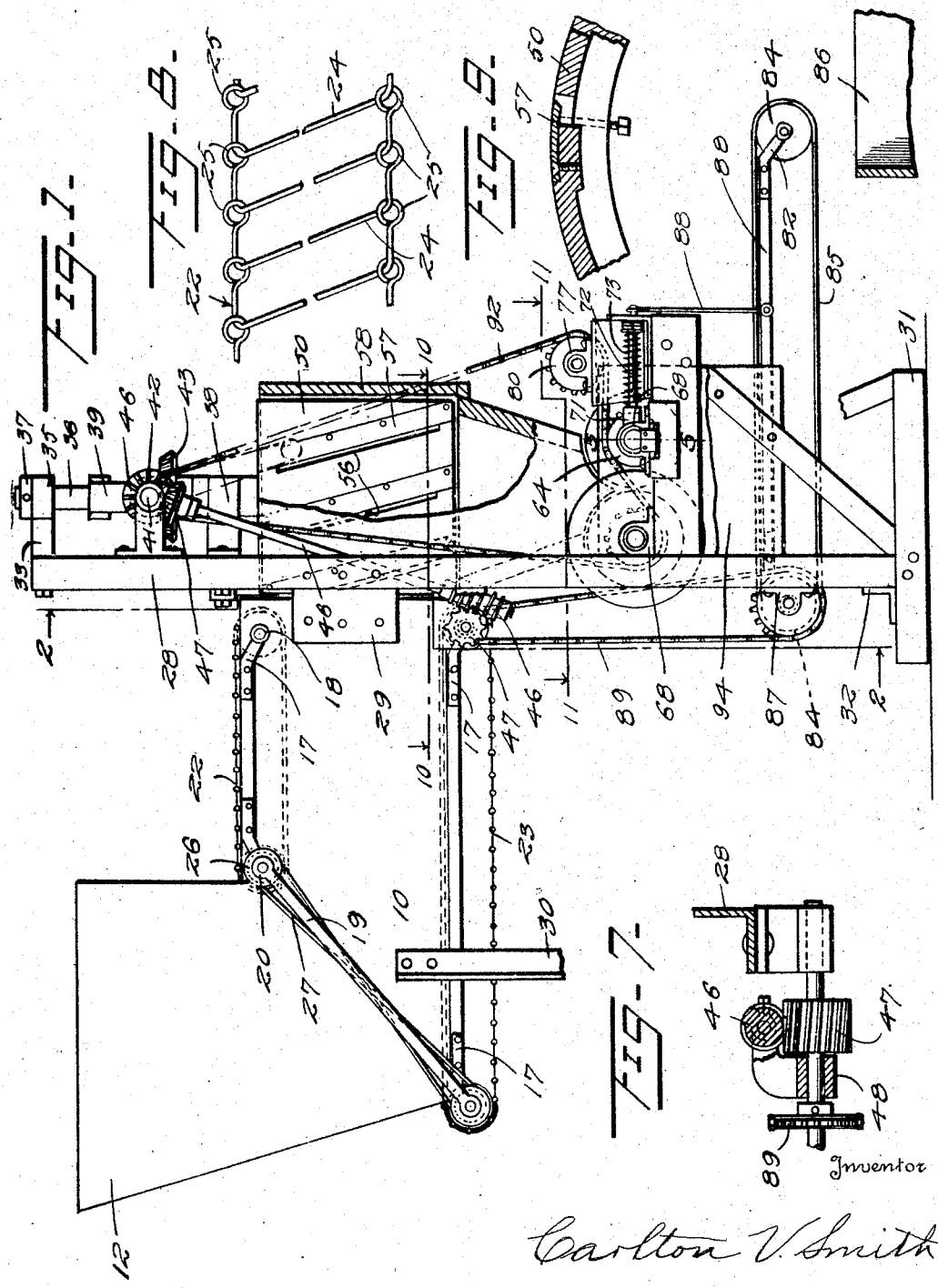
Inventor
Carlton V. Smith

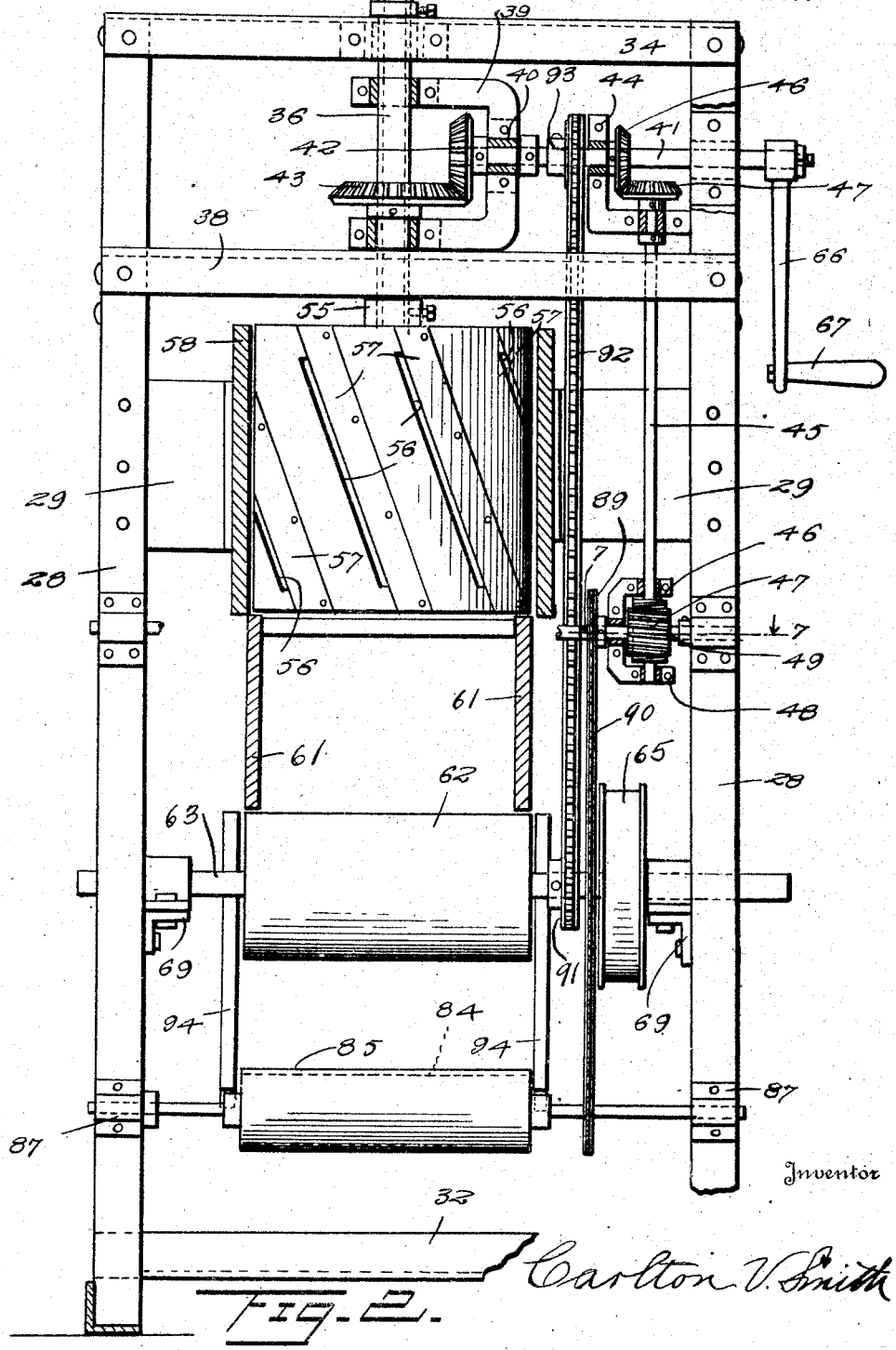

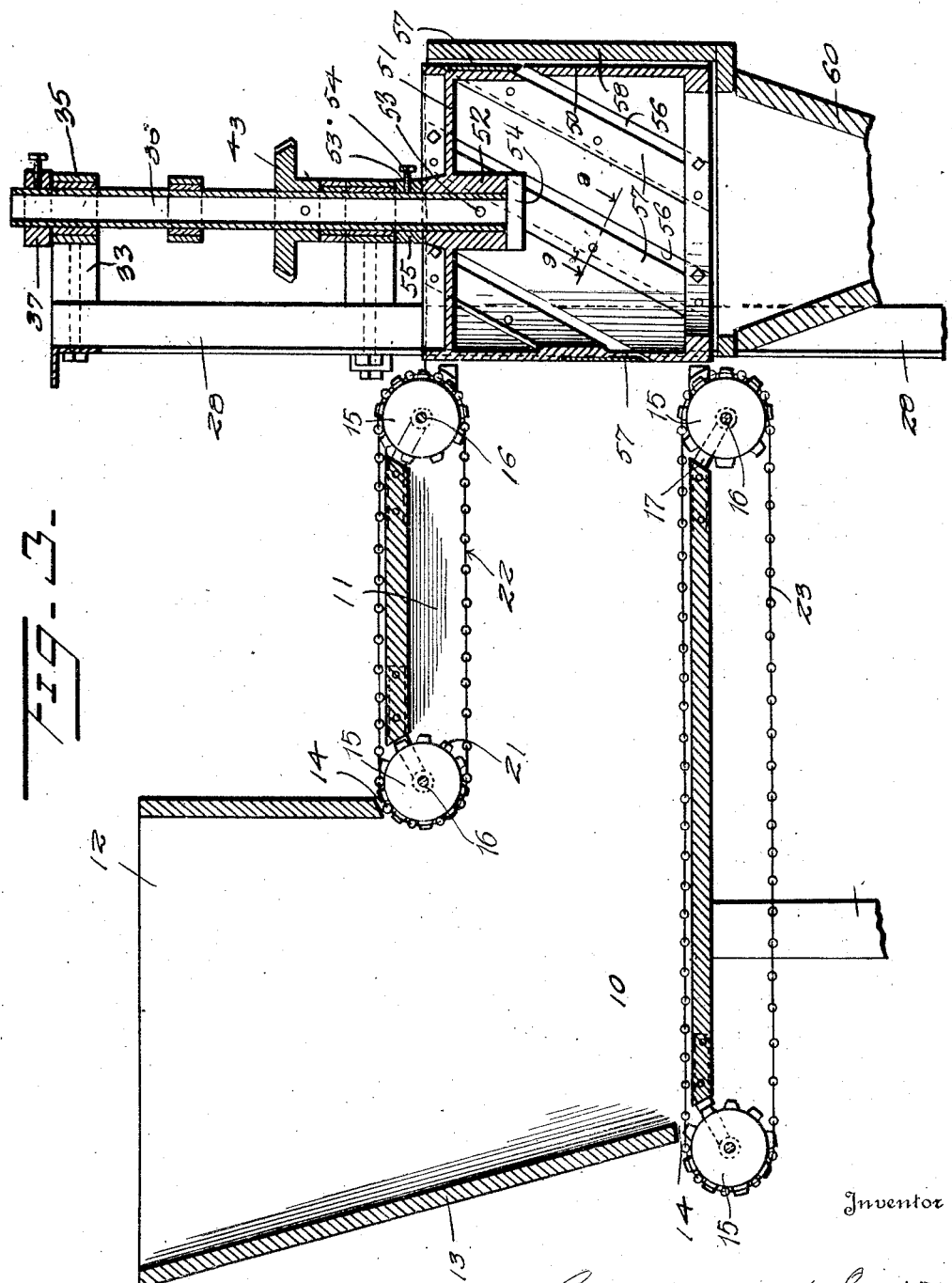

Sept. 8, 1925.
C. V. SMITH
VEGETABLE CUTTER
Filed June 19, 1924   5 Sheets-Sheet 4
1,553,007
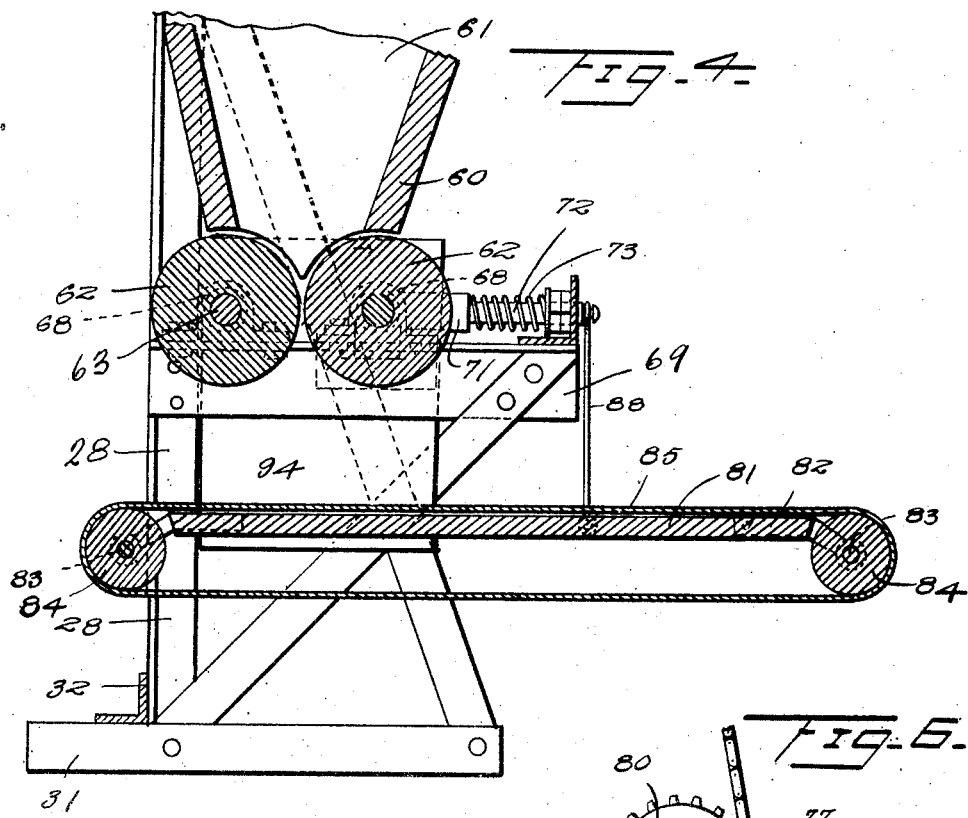
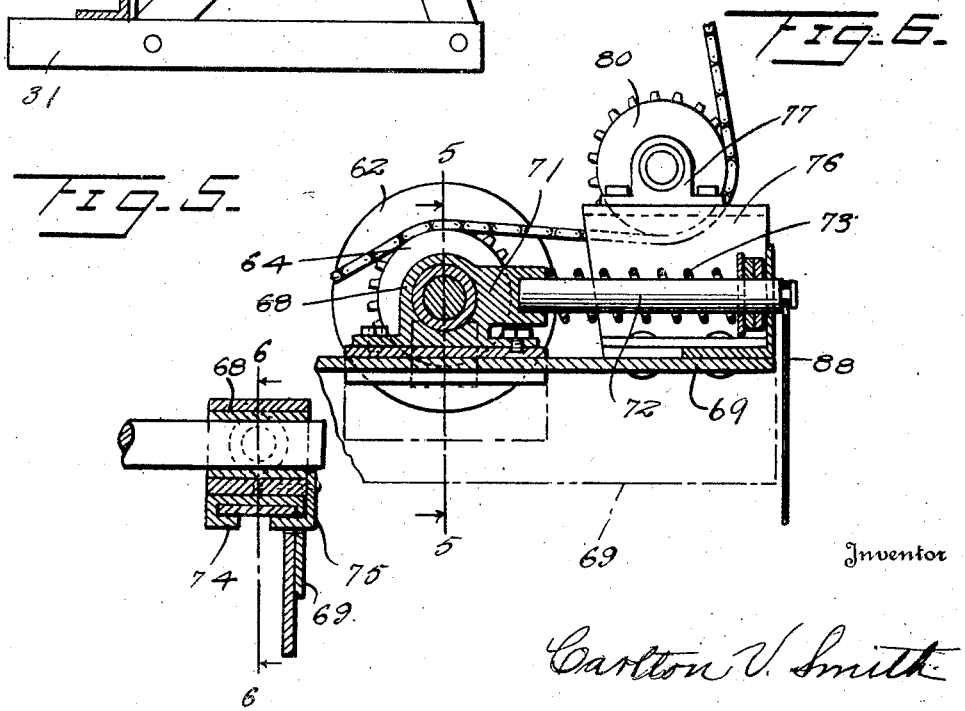
Inventor
Carlton V. Smith

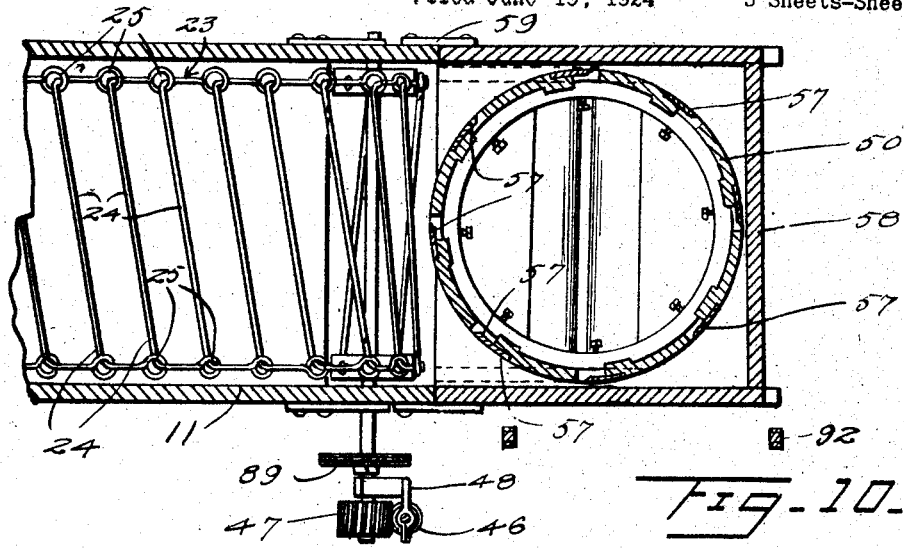
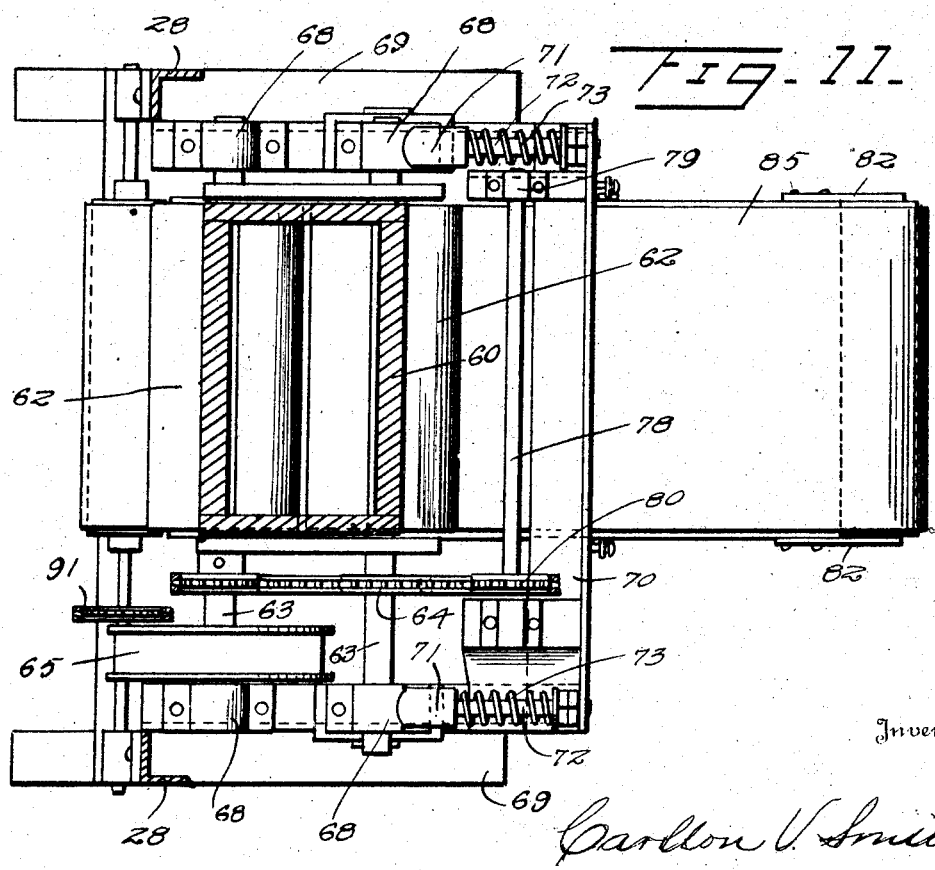

Patented Sept. 8, 1925.

1,553,007

UNITED STATES PATENT OFFICE.

CARLTON V. SMITH, OF COQUILLE, OREGON.

VEGETABLE CUTTER.

Application filed June 19, 1924. Serial No. 720,958.

*To all whom it may concern:*

Be it known that I, CARLTON V. SMITH, a citizen of the United States, residing at Coquille, in the county of Coos and State of Oregon, have invented certain new and useful Improvements in a Vegetable Cutter, of which the following is a specification.

This invention relates to improvements in vegetable cutters and is particularly adapted for cutting kraut.

An important object of the invention is to provide a cutting machine which will automatically feed, cut, and crush cabbage or other vegetables to be prepared.

A further object of the invention is the provision of a cutter of this character which may be operated by hand or machine and perform the aforementioned operations at a comparatively high speed.

A still further object of the invention is to provide a cutting machine particularly adapted for preparing kraut which will not become clogged or otherwise inoperative while cutting or preparing the cabbage.

A still further object of the invention is to provide a cutting machine of this character which is comparatively simple in construction, yet very durable and efficient for this purpose.

Other objects and advantages of this invention will be apparent during the course of the following description.

In the accompanying drawings forming a part of this specification and in which like numerals are employed to designate like parts throughout the same:

Figure 1 is a side elevation of my assembled cutting machine,

Figure 2 is an enlarged sectional view taken on the line 2—2 of Figure 1,

Figure 3 is a vertical longitudinal section taken through the center of the device, Figure 4 is a vertical sectional view taken through the crushing unit, Figure 5 is a vertical sectional view taken on the line 5—5 of Figure 1, Figure 6 is a similar view taken on the line 6—6 of Figure 5, Figure 7 is a horizontal sectional view taken on the line 7—7 of Figure 2, Figure 8 is a perspective view showing a section of my improved chain conveyor.

Figure 9 is an enlarged sectional view taken on the line 9—9 of Figure 3,

Figure 10 is a horizontal section taken on line 10—10 of Figure 1, and

Figure 11 is a similar view taken on line 11—11 of Figure 1.

In the drawings, wherein for the purpose of illustration is shown the preferred embodiment of my invention, the numeral 10 generally indicates the feed container which comprises a horizontally positioned casing 11 which is preferably square in cross section and connects with a vertically positioned hopper 12, the upper end of which is open and which is provided with an inclined side 13 to permit the cabbage to be readily placed therein and transmitted to the cutter which will be hereinafter described. The extremities of the top and bottom of the casing 11 are cut away to form transverse slots 14 enabling four conveyor rollers 15 to be positioned thereunder and their upper arcuate sections extending slightly above the upper sides. These rollers are mounted upon transverse shafts 16 extending through the sides of the casing and supported by four angular brackets 17 secured to the outer sides of the casing and provided with bearings 18 to receive the extremities of the shafts. A pair of strengthening rods 19 provided with bearing collars 20 at both extremities are mounted upon the extreme ends of the rear, upper and lower roller shafts and are intended to properly space the shafts in order to retain a belt to be hereinafter described, tightly thereon.

The conveyor rollers 15 are provided with toothed sprockets 21 mounted upon the intermediate portions of the rollers and adapted to rotate an upper conveyor chain 22 and lower conveyor chain 23. These conveyor chains are composed of a plurality of U-shaped rods 24 clearly illustrated in Figure 8, the extremities being looped to form securing rings 25 forming a continuous conveyor chain extending across the rollers within the casing. The parallel cross rods of the chain assume an angular inclination the purpose of which will be better understood as the description follows. As it is desirable that both the upper and lower conveyor chains be rotated at the same speed, the extremities of the upper and lower rear roller shafts carry pulleys 26 securely mounted upon the shafts and connected by a belt 27 inversely positioned upon the pulleys to cause the opposed sections of the conveyor chain to move in the same direction.

The front extremity of the casing 11 is secured to a pair of vertical supporting beams 28 by means of a pair of Z-shaped plates 29 fastened to the sides of the casing and upright beams. I also provide a pair of upright supporting beams 30 secured to the lower rear portion of the casing and extending downwardly therefrom to support the rear of the feed container or chute. The upright supporting beams 28 are preferably constructed of angle iron and have their lower extremities riveted or otherwise secured to a pair of horizontal supporting beams 31 also constructed of angle iron. Transversely mounted between the lower extremities of the supporting beams 28 and secured thereto is a spacing beam 32 forming a firm supporting frame.

An extension bracket 33 is mounted in the central portion of a transverse beam 34, the extremity of the bracket 33 being provided with a bearing collar 35 for the purpose of supporting a tubular shaft 36 mounted vertically through the said bracket and retained thereon by means of a collar 37 secured to the shaft by means of a set screw or the like. A second transverse beam 38 is mounted upon the frame immediately below the beam 34 and supports a U-shaped bracket 39 which has a bearing 40 formed in the vertical connecting section in which is rotatably mounted a horizontal shaft 41. One extremity of the shaft 41 carries a bevel gear 42 which meshes with a somewhat larger bevel gear mounted upon the hollow shaft 36 as denoted by the numeral 43, this gear being driven by the gear 42. The intermediate portion of the shaft 41 is rotatably mounted in an L-shaped bracket 44, the other leg of the bracket supporting a vertical drive shaft 45. A pair of bevel gears 46 and 47 are mounted upon the shafts 41 and 45 and adapted to mesh together, causing rotation of the shaft 45 through the shaft 41. The lower extremity of the drive shaft 45 carries a worm gear 46 which meshes with suitable gear 47 and rotates the same. The worm gear 46 and spiral gear 47 are supported in suitable bearings formed in a U-shaped bracket 48, the shaft 49 carrying the helical gear 47 extending transversely across the supporting frame and mounted in suitable bearings thereon. Mounted on the lower extremity of the shaft 36 is a cylindrical member 50 enclosed by an end plate 51 at the upper extremity in the central portion of which is formed a vertical sleeve 52. The shaft 36 extends through this sleeve and is rigidly connected thereto by a bolt 53 extending through the sleeve and shaft and causing the cylindrical member to rotate with the shaft. A locking nut 54 is threadedly mounted upon the extreme end of the shaft and tightens the same in relation to the sleeve 52. A collar 55 is mounted upon the shaft immediately above the sleeve 52 and retained in position by a set screw or the like.

The cylinder 50 is provided with a plurality of spaced angular slots 56 adjacent to which are formed recesses adapted to receive a plurality of knife blades 57. These blades are positioned within the said recesses and bolted or otherwise secured to the cylinder, one edge thereof being beveled to provide cutting means and extending into the slots 56 provided for this purpose. It is to be noted that rotation of the blade retaining bolts will permit movement of the blades relative to the cylinder permitting the operator to adjust the cutting blades as desired. A suitable housing 58 is positoned about the cylinder and connected to the horizontal casing 11 by the connecting strips 59. The lower portion or bottom of the cylinder housing is open as is also the cylinder, the cut vegetables or other matter being transmitted through the cylinder and permitted to drop into a trough constructed of a pair of inclined end boards 60 enclosed by side boards 61 and fed upon a pair of crushing rolls 62 mounted upon transverse shafts 63. These shafts are supported by suitable bearings mounted upon the supporting frame and have a pair of sprockets 64 mounted thereon adjacent the said rolls. The shaft adjacent the vertical supporting beams 28 also carries a pulley 65 keyed or otherwise festened to the shaft to permit belt connection when it is desirable to drive the apparatus by a motor or the like.

In the form of my invention herewith shown, I provide a crank 66 secured to an extension of the shaft 41 and having a handle 67 mounted upon the extremity thereof enabling the device to be operated by hand.

The bearings 68 in which the crushing roller shafts 63 are rotatably mounted are secured to a pair of horizontal support beams 69 constructed of angle iron and extending forwardly of the vertical supports 28, the outer extremities being strengthened by a transverse beam 70 secured to the extremities thereof. The bearings of the front roller shaft are provided with circular extensions 71 the extremities having recesses formed therein adapted to receive one end of a circular rod, the other end of which is mounted in a bracket and supports a coil spring 73, the bearings being slidably mounted upon the beam to permit adjustment of the rolls as clearly shown in Figures 5 and 6. The slidable bearing is mounted upon a U-shaped bracket 74 mounted upon the beam adapted to prevent displacement of the bearing, an angular strip 75 being secured to the outer side of the bearing and having one leg thereof extending within a suitable groove formed within the beams 69. A pair of bracket plates 76 are mounted on the extreme ends of the beams and support a bearing 77 in which is rotatably mounted a shaft 78, the other extremity of the shaft being mounted in a similar bearing 79. This shaft is adapted to support a sprocket wheel 80 mounted near one extremity thereof and keyed or otherwise fastened to the shaft.

Positioned beneath the crushing rolls 62 is a conveyor platform 81, the extremities having a pair of brackets 82 secured thereon for the purpose of retaining a pair of transverse roller shafts 83 upon which are mounted conveyor rollers 84. These rollers are adapted to drive a conveyor belt 85 upon which the crushed vegetable matter is deposited and conveyed to a suitable vat or receptacle 86. The rear conveyor shaft is also supported by bearing brackets 87 secured to the vertical beams 28 and forming a support for the rear portion of the platform. The front portion of the platform is supported by a pair of supporting rods 88 which connect with the platform and suitable projections upon the roller supporting beams.

When the machine is to be driven by hand the crank 66 is rotated and rotary movement imparted to the transverse shaft 41 which rotates the cutting cylinder by means of the bevel gears 42 and 43, the bevel gears 46 and 47 mounted upon the intermediate portion of the shaft driving the conveyor chains 22 and 23 through the vertical shaft 45. The crushing rollers and conveyor belt are driven by means of chains, one chain being positioned over a sprocket wheel 89 secured to an extension of the chain conveyor shaft, the lower portion of this chain 90 connecting with a similar sprocket wheel 91 rigidly secured to the shaft of one of the belt conveyor rollers. A second chain 92 is mounted upon a sprocket 93 secured to the upper transverse shaft 41 and engages the sprocket 64 and 80 mounted upon the crushing roller shafts and idler shaft respectively. These chains and gears so connect the mechanism as to operate the same at the proper speed ratio at all times enabling the vegetable or other matter to be passed through the machine and be conveyed to the receiving vat. It is also obvious that the device may be motor driven by merely connecting a belt with the pulley 65 mounted on one of the crushing roller shafts.

In operation, the cabbage or other vegetable matter is placed in the hopper 12 where it will be engaged by the conveying chains 22 and 23 and carried through the horizontal casing 11. The revolving cylinder or drum 50 having the blades mounted thereon will then slice portions of the cabbage from the head, binding being prevented by the angular position of the conveyor rods 24. The cut cabbage will then drop through the lower open end of the cylinder and fall upon the rolls 62 which revolve in reverse directions and force the cabbage therebetween crushing the same. It is obvious that the rolls may be adjusted by operation of the sliding bearings permitting the operator to so space the rollers as to crush or bruise the cabbage as found desirable. The cabbage is next forced upon the moving conveyor belt 85, a pair of side boards 94 being mounted upon the sides of the conveyor platform to prevent displacement of the cabbage. As the rear portion of the conveyor belt travels towards the forward portion of the machine it will obviously carry the cabbage in this direction and deposit the same in a suitable receptacle positioned thereunder.

It is also to be noted that the blades mounted upon the revolving cylinder or drum may be adjusted by means of bolts so that the cabbage may be cut coarse or fine as found desirable. This adjustment also enables the machine to be used in the preparation of various other commodities which it is desired to cut or crush, or both.

It is to be understood that the form of my invention herewith shown and described is to be taken as the preferred example of the same, and that various changes as to the shape, size, and arrangement of parts may be resorted to without departing from the spirit of the invention, or the scope of the subjoined claims.

Having thus described my invention, I claim:

1. A machine of the character described comprising a hopper, a casing connected to said hopper having conveying chains mounted therein, a revolving cylinder mounted at the extremity of the said casing, cutting blades secured to the said cylinder, a hopper chute formed beneath the said revolving cylinder, a pair of crushing rollers rotatably mounted beneath the said chute, means for adjusting the said rollers, a conveyor platform positioned beneath the said rollers, and a conveyor belt mounted upon the platform adapted to convey the crushed matter to a suitable receptacle.

2. A machine of the character described comprising a hopper, a horizontal casing positioned at the lower portion of the said hopper, upper and lower conveyor chains mounted on the said casing, a cylinder rotatably mounted at one extremity of the said casing, a plurality of cutting blades adjustably mounted upon the said cylinder, a housing formed about the said cylinder, a hopper or chute formed beneath the said cylinder, a pair of coacting crushing rollers positioned beneath the said hopper, means for adjusting the said rollers, and a conveyor belt mounted upon suitable rollers mounted beneath the said crushing rollers.

3. A vegetable cutter comprising a feed hopper, a horizontal casing formed at the lower portion of the said hopper, a plurality of conveyor rollers mounted in the said casing, means for supporting the said rollers, a pair of conveyor chains mounted on the said rollers, a cylinder having its upper extremity enclosed and the lower extremity open mounted at the open end of the horizontal casing, a plurality of angularly positioned blades adjustably secured to the said cylinder, means for rotating the said cylinder, a housing formed about the said cyinder, a tapered hopper or chute formed on the lower extremity of the cylinder housing, a pair of crushing rollers positioned beneath the said hopper, means for supporting the said rollers, a platform positioned beneath the said rollers, conveyor rollers rotatably mounted at the extremities of the platform, and a conveyor belt mounted upon the rollers and adapted to be rotated thereby.

4. A vegetable cutter comprising an open end hopper, a conveying casing formed on the lower extremity of the said hopper, conveyor chains rotatably mounted at the upper and lower portions of the said casing, means for actuating the said conveyor chains, a cylinder having its upper end closed and its lower end open mounted at the front end of the said casing, a plurality of angularly positioned blades secured to the said cylinder, a housing formed about the said cylinder, a shaft connected with the upper portion of the cylinder and adapted to support the same, means for rotating the said shaft and cylinder, a tapered hopper formed on the lower portion of the cylinder housing, a pair of crushing rollers positioned beneath the said hopper, means for supporting the said rollers, and means for adjusting one of the said rollers, a conveyor platform mounted beneath the said rollers, a conveyor belt rotatably mounted upon the said platform, and means for driving the said rotatable element.

5. A vegetable cutter comprising a hopper, a horizontal feed casing secured to the lower portion of the said hopper, rotatable conveyor chains mounted at the top and bottom of the said casing, and means for driving the said conveyor chains; a cylinder having its lower end open and provided with angular slots in the sides thereof mounted at the front of the said casing, a vertical shaft positioned within suitable bearings connected to said cylinder, means for rotating the said shaft and cylinder, a plurality of knife blades secured about the sides of the cylinder adjacent the said slots therein; a housing built about the said cylinder, a hopper or chute formed on the lower portion of the said cylinder housing, a pair of crushing rollers positioned beneath the said hopper or chute, one of the said rollers being mounted upon movable bearings, means for adjusting the said rollers and bearings, and means for driving the said rollers in reverse directions; a longitudinal platform positioned below the said crushing rollers, conveyor rollers positioned in suitable bearings mounted upon the extremities of the said platform, a conveyor belt mounted upon the rollers and actuated thereby, and means for rotating the said conveyor rollers and belt.

In testimony whereof, I have affixed my signature.

CARLTON V. SMITH.